US012324938B2

(12) United States Patent
McKay et al.

(10) Patent No.: US 12,324,938 B2
(45) **Date of Patent: *Jun. 10, 2025**

(54) CONNECTION APPARATUS FOR BREATHING APPARATUS

(71) Applicant: DRAEGER SAFETY UK LIMITED, Blyth (GB)

(72) Inventors: Timothy McKay, Northumberland (GB); Paul Nicholas Townsend, Northumberland (GB); Jason Edward Allan, Tyne and Wear (GB); Evan Hannard, Tyne and Wear (GB); Lee Kevin Brimer, Newcastle Upon Tyne (GB)

(73) Assignee: DRAEGER SAFETY UK LIMITED, Blyth (GB)

( * ) Notice: Subject to any disclaimer, the term of this patent is extended or adjusted under 35 U.S.C. 154(b) by 536 days.

This patent is subject to a terminal disclaimer.

(21) Appl. No.: 17/255,294

(22) PCT Filed: Jun. 24, 2019

(86) PCT No.: PCT/GB2019/051777
§ 371 (c)(1),
(2) Date: Dec. 22, 2020

(87) PCT Pub. No.: WO2020/002895
PCT Pub. Date: Jan. 2, 2020

(65) Prior Publication Data

US 2021/0268318 A1 Sep. 2, 2021

(30) Foreign Application Priority Data

Jun. 26, 2018 (GB) ..................................... 1810481

(51) Int. Cl.
*A62B 9/04* (2006.01)
*A62B 7/04* (2006.01)
(Continued)

(52) U.S. Cl.
CPC .................. *A62B 9/04* (2013.01); *A62B 7/04* (2013.01); *A62B 9/022* (2013.01); *A62B 18/10* (2013.01)

(58) Field of Classification Search
CPC ... A62B 9/00; A62B 9/02–04; A62B 7/00–04; A62B 7/10–12; A62B 18/00; A62B 18/02–10; A61M 16/06–0891
See application file for complete search history.

(56) References Cited

U.S. PATENT DOCUMENTS 5,271,390 A 12/1993 Gray et al.
5,666,949 A * 9/1997 Debe ................... A62B 18/088
116/206
(Continued)

FOREIGN PATENT DOCUMENTS

DE 102012019835 A1 4/2014
EP 3034132 A1 6/2016
(Continued)

OTHER PUBLICATIONS

International Search Report, dated Nov. 8, 2019, and Written Opinion issued in the international application.
(Continued)

*Primary Examiner* — Rachel T Sippel
*Assistant Examiner* — Jacqueline M Pinderski
(74) *Attorney, Agent, or Firm* — Banner & Witcoff, Ltd.

(57) ABSTRACT

Disclosed herein are connection apparatus for connecting breathing gas delivery components of a breathing apparatus. The connection apparatus comprises a male connector configured to be received in a corresponding female port, the
(Continued)

male connector comprising a perimeter wall defining an external shape of the male connector. In some examples, the male connector defines an insertion axis along which the male connector is receivable into a corresponding female port, and a distal edge of the perimeter wall defines a distal face of the perimeter wall and at least a portion of the distal face is inclined with respect to the insertion axis of the male connector. In some examples, the perimeter wall comprises first and second wall portions which taper together such that a first edge of the first wall portion and a first edge of the second wall portion are connected at an apex portion.

23 Claims, 8 Drawing Sheets

(51) Int. Cl.
*A62B 9/02* (2006.01)
*A62B 18/10* (2006.01)

(56) References Cited

U.S. PATENT DOCUMENTS 6,581,594 B1* 6/2003 Drew ................ A61M 16/0633 128/207.12
2002/0185134 A1* 12/2002 Bishop ............. A61M 16/0688 128/206.25
2005/0011524 A1* 1/2005 Thomlinson ...... A61M 16/0825 128/207.18
2006/0124131 A1* 6/2006 Chandran ......... A61M 16/0666 128/206.28
2007/0125384 A1* 6/2007 Zollinger .............. A61M 16/06 128/206.24
2010/0307506 A1 12/2010 Kielow et al.
2013/0199520 A1* 8/2013 Dhuper ............... A61M 16/127 128/205.24
2014/0053831 A1* 2/2014 Leamon .............. A61M 15/025 128/200.14
2015/0068519 A1 3/2015 Bambrilla et al.
2015/0283493 A1* 10/2015 Billingsley ............ A62B 23/02 128/205.29
2015/0352308 A1* 12/2015 Cullen .............. A61M 16/0683 128/205.25
2021/0268317 A1* 9/2021 Mckay ................... A62B 9/022

FOREIGN PATENT DOCUMENTS

| | | | |
|---|---|---|---|
| GB | 2332932 | A | 7/1999 |
| GB | 2505484 | A | 3/2014 |
| WO | 2005016425 | A1 | 2/2005 |
| WO | 2006009885 | A2 | 1/2006 |
| WO | 2006138345 | A1 | 12/2006 |
| WO | 2011014931 | A1 | 2/2011 |
| WO | 2012113027 | A1 | 8/2012 |
| WO | 2012170961 | A1 | 12/2012 |
| WO | 2014120502 | A2 | 8/2014 |
| WO | 2014174393 | A2 | 10/2014 |
| WO | 2017077485 | A1 | 5/2017 |
| WO | 2019106541 | A1 | 6/2019 |

OTHER PUBLICATIONS

UK Search Report, dated Nov. 15, 2019 issued in priority GB Application No. 1810481.0.
UK Search Report, dated Dec. 13, 2018 issued in priority GB Application No. 1810481.0.

* cited by examiner

CONNECTION APPARATUS FOR BREATHING APPARATUS

CROSS-REFERENCE TO RELATED APPLICATIONS

This application claims the priority of PCT Application No. PCT/GB2019/051777, filed on Jun. 24, 2019, which claims the priority of GB Application No. GB1810481.0, filed on Jun. 26, 2018, the entire contents of which being fully incorporated herein by reference.

BACKGROUND OF THE INVENTION

The present disclosure concerns connection apparatus for connecting components of a breathing apparatus. In particular, the disclosure concerns connecting apparatus for connecting a lung demand valve to a breathing face mask.

Breathing apparatus for emergency services typically comprise, amongst other features, a source of breathing gas configured to be supported by the user, a face mask to be worn by the user, and a lung demand valve (LDV) for delivering breathing gas from the source to the face mask on demand.

In many cases, it is desirable for the LDV to be detachable from the face mask. Such an arrangement means that the mask can be donned in good time before entering an emergency environment, but the LDV and, hence, the limited supply of breathing gas can be connected shortly before entering the emergency environment to maximise the operating time for the user.

In some prior systems, a port apparatus is provided for connecting the LDV to the face mask, whereby a cylindrical male port of the LDV is received in a corresponding cylindrical female port of the mask. In such systems, the male and female port elements can typically rotate with respect to one another to provide flexibility of movement for the user. However, this can result in the orientation of the LDV being unknown, particularly in low visibility environments, which may jeopardise user safety if their control features (e.g. buttons) of the LDV cannot be quickly located. Furthermore, as the mask is typically worn during connection of the LDV to the mask, it may be difficult for the user to quickly align the male and female port elements correctly.

Accordingly, it will be understood that improvements are desirable in the field of connections for breathing apparatus.

SUMMARY OF THE INVENTION

According to a first aspect there is provided a connection apparatus for connecting breathing gas delivery components of a breathing apparatus comprising: a male connector configured to be received in a corresponding female port, the male connector comprising a perimeter wall defining an external shape of the male connector; wherein the male connector defines an insertion axis along which the male connector is receivable into a corresponding female port; and wherein a distal edge of the perimeter wall defines a distal face of the perimeter wall and at least a portion of the distal face is inclined with respect to the insertion axis of the male connector.

Breathing gas delivery components may be any components of a breathing apparatus which are operable to deliver or supply breathing gas to a user, or to transport breathing gas (including exhaled breathing gas). The breathing gas delivery components may, for example, include lung demand valves, closed circuit breathing apparatus supply ports and hoses, breathing face masks, and breathing gas transport hoses.

The perimeter wall may extend in a direction parallel to the insertion axis of the male connector. The insertion axis may be any axis, such as a notional axis, which is parallel to an axial or longitudinal direction of the male connector or the female port. The insertion axis may define an insertion direction or vector. The insertion direction may be a direction parallel to the insertion axis.

The perimeter wall may define a perimeter or external cross-sectional shape of the male connector when viewed along the insertion axis. An outer surface of the perimeter wall may extend in a direction parallel to the insertion axis. The distal face of the perimeter wall may be the distal face of the male connector. The perimeter wall may enclose at least one conduit. The perimeter or external cross-sectional shape of the male connector may be substantially prismatic. The cross-sectional area of the male connector may reduce along the male connector, such that the male connector tapers towards a distal end thereof.

The corresponding female port may define a receiving axis along which the male connector is receivable into the female port. In use when the male connector is received within a corresponding female port, the insertion and receiving axes may be arranged coaxially.

The inclined portion of the distal face may be formed in a plane which is inclined with respect to the insertion axis. The inclined portion may be obliquely inclined with respect to the insertion axis or insertion direction.

The distal face of the perimeter wall may comprise a first portion which is substantially perpendicular to the insertion axis or direction and a second portion which is inclined with respect to the insertion axis or direction. The first portion may be formed in a plane which is substantially perpendicular to the insertion axis. The distal (i.e. outermost) edge of the perimeter wall may be known as the highlight of the perimeter wall. The distal face may be the highlight plane or surface formed by the highlight.

A step may be formed in the distal face between the first portion and the second portion.

The second portion of the distal face may form a chamfered face between the first portion of the distal face and the outer surface of the perimeter wall.

The male connector may further comprise a partition wall extending internally between first and second parts of the perimeter wall so as to form first and second conduits within the male connector. The partition wall may extend parallel to the insertion axis.

The first portion of the distal face may be formed on a first side of the partition wall and the second portion of the distal face may be formed on a second side of the partition wall.

The perimeter wall may be configured such that a perimeter of the male connector comprises an apex portion. The perimeter may be referred to as the external cross-sectional shape of the male connector.

A height of at least a portion of the perimeter wall may decrease with increasing distance away from the apex portion such that the inclined portion of the distal face is formed is inclined away from the apex portion.

The perimeter wall may be configured such that a perimeter of the male connector is substantially triangular.

The perimeter wall having first, second, and third wall portions and first, second, and third vertex portions, one of the vertex portions forming the apex portion. The wall portions may be substantially planar. The vertex portions may be radiused or chamfered.

The perimeter wall may be configured such that a perimeter of the male connector is substantially elliptical or oval.

The perimeter wall has first and second vertex portions. One of the vertex portions may form the apex portion.

The perimeter wall may be configured such that the male connector has an integer order of rotational symmetry about the insertion axis. The perimeter wall may be configured such that the male connector has rotational symmetry of order 1, order 2, order 3, or order 4 about the insertion axis. The perimeter wall may be configured such that the male connector has a non-infinite order of rotational symmetry. The perimeter wall may be non-circular, annular, or trapezoidal in cross section.

In a second aspect, there is provided a connection apparatus for connecting breathing gas delivery components of a breathing apparatus comprising: a male connector configured to be received in a corresponding female port, the male connector comprising a perimeter wall which defines an external shape of the male connector; wherein the perimeter wall comprises first and second wall portions which taper together such that a first edge of the first wall portion and a first edge of the second wall portion are connected at an apex portion.

The perimeter wall comprise a substantially prismatic portion. The substantially prismatic portion may be externally substantially prismatic, but may have a non-prismatic interior and/or may have one or more external engaging features for engaging with a corresponding female port. The perimeter wall may be configured such that the male connector has a non-circular external cross-sectional shape. The external cross-sectional shape of the male connector may be substantially prismatic. The cross-sectional area of the male connector may reduce along the male connector, such that the male connector tapers towards a distal end thereof.

The perimeter wall may comprise a third wall portion which tapers together with the first and second wall portions respectively such that a first edge of the third wall portion and a second edge of the first wall portion meet at a first corner portion, and a second edge of the third wall portion and a second edge of the second wall portion meet at a second corner portion.

The first and second corner portions may be radiused corner portions or chamfered corner portions.

The perimeter wall may be configured such that the male connector has a substantially triangular external cross-sectional shape.

The external cross-sectional shape may be substantially trapezoidal. The apex portion may comprise an apex wall portion, the first edges of the first and second wall portions being formed adjacent first and second edges of the apex wall portion.

The perimeter wall may be configured such that the male connector has a substantially elliptical or oval external cross sectional shape.

The apex portion may be a radiused apex portion between the first and second wall portions.

The connection apparatus may be configured such that the apex portion is the uppermost part of the male connector when received in a corresponding female port in use.

The connection apparatus may accord to both the first and second aspects described herein.

The connection apparatus may further comprise a corresponding female port for receiving the male connector. The female port may comprise a peripheral wall defining a cavity for receiving the male connector.

The peripheral wall may be shaped so as to correspond to the outer surface of the perimeter wall of the male connector. The peripheral wall may extend in a direction parallel to the insertion axis of the male connector. The male connector may not be rotatable with respect to the female port when received within the port. The peripheral wall may comprise an apex channel portion for receiving the apex portion of the male connector.

The female port may comprise first and second wall portions which taper together such that a first edge of the first wall portion and a first edge of the second wall portion are connected at an apex channel portion. The apex channel portion may be for receiving the apex portion of the male connector in use. The first and second wall portions of the female port may be configured so as to guide the apex portion of the male connector into the apex channel portion.

The connection apparatus may be configured such that, when the inclined portion of the distal face of the male connector is in contact with a portion of the peripheral wall of the female port, the application of force on the male connector towards the female port results in a lateral and/or rotational movement of the male connector with respect to the female port. The connection apparatus may be configured such that, when the inclined portion of the distal face of the male connector is in contact with a portion of the peripheral wall of the female port, the application of force on the male connector towards the female port parallel to the inclination axis results in a lateral, transverse, and/or rotational movement of the male connector with respect to the inclination axis or direction.

The male connector may be provided on a breathing gas supply component, such as a lung demand valve or a CCBA connector for supplying breathing gas from a CCBA to the breathing face mask and the female port may be provided on a breathing face mask. Alternatively, the male connector may be provided on a breathing face mask and the female port may be provided on a breathing gas supply component.

In a third aspect, there is provided a breathing apparatus comprising a source of breathing gas configured to be supported by a user, a breathing face mask configured to be worn by a user, a breathing gas supply component configured to deliver breathing gas from the source to the breathing face mask, wherein the breathing apparatus further comprises connection apparatus for connecting the breathing gas supply component to the breathing face mask according to either or both of the first and second aspects described herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the accompanying Figures, in which.

DETAILED DESCRIPTION OF THE INVENTION

Figure 1:
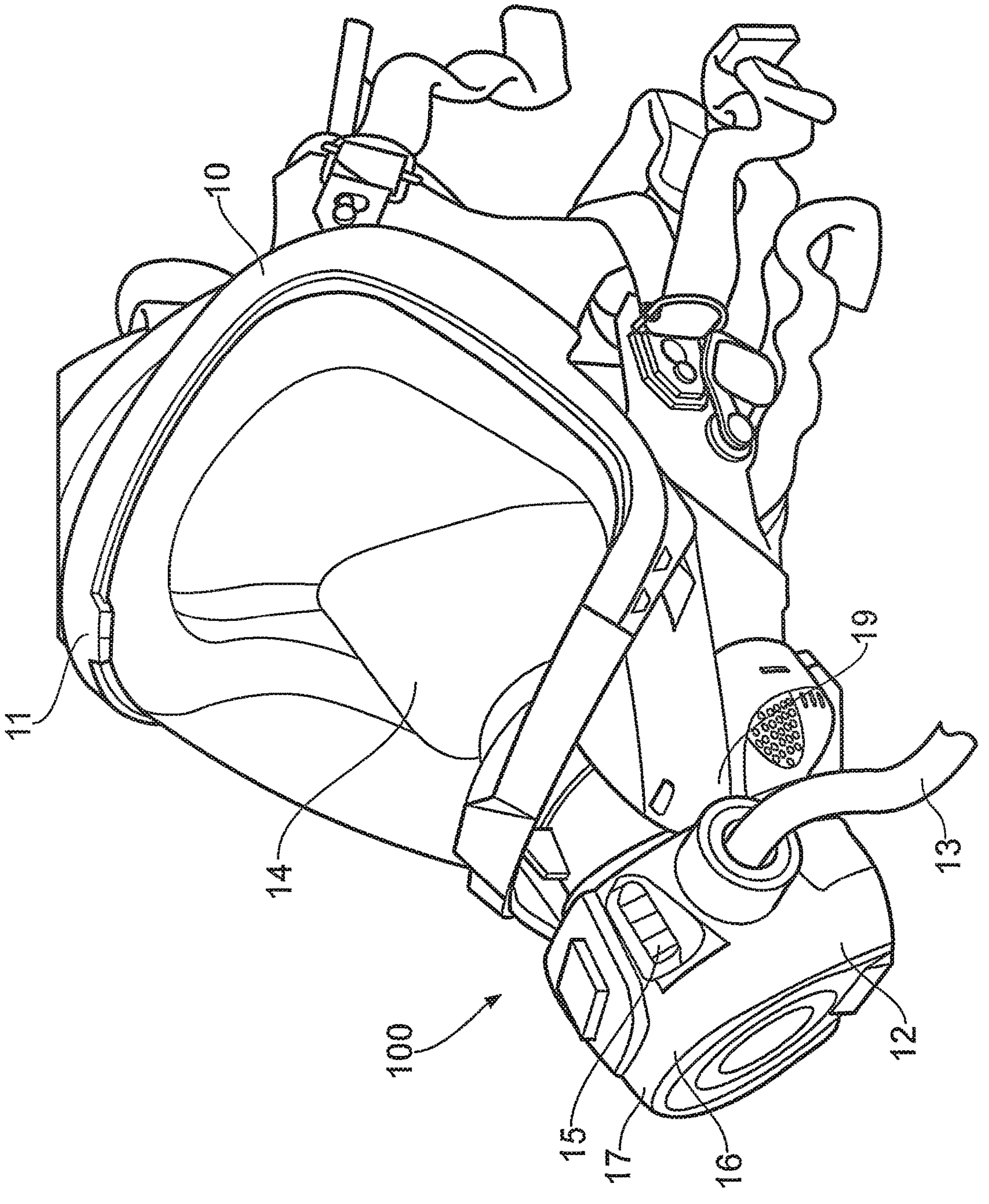
FIG. 1 shows an example of a breathing apparatus comprising a lung demand valve and a breathing face mask.

Referring first to FIG. 1, a breathing apparatus 10 is shown by way of example. The breathing apparatus 10 comprises a number of breathing gas delivery components. In this example, two particular breathing gas delivery components are shown: a breathing face mask ("mask") 11 to be worn on a user's head and a breathing gas supply component, in this example a lung demand valve (LDV) 12, connected to the mask 11 with a connection apparatus 100, which will be described in more detail below. The LDV 12 is provided with breathing air via a hose 13 which is connected to a source of breathing gas, such as a breathing gas which may be supported on the user, for example on a wearable back plate (not shown). In this example, an LDV 12 is connected to the mask 11. However, in other examples, the connection apparatus described herein may be used to connect other breathing gas delivery components. In another example, the LDV 12 may instead be a breathing gas supply port of a closed circuit breathing apparatus (or "CCBA" or "rebreather"). In these examples, the CCBA supply port or connector port is plugged directly into a breathing gas face mask, such as the exemplary mask 11, in order to provide breathing gas to the user from the CCBA circuit. Although the below detailed description relates to the connection of an LDV to a breathing face mask, it should be generally understood that the connection apparatus described herein may be used to connect any components utilised for the supply, delivery, or transport of breathing gas in any type of breathing apparatus including, but not limited to, SCBAs, CCBAs, and SCUBAs.

The mask 11 comprises an inner mask 14 which is arranged over the user's nose and mouth in use. When the user breathes in, the pressure in the mask 11 is reduced and the LDV 12 is configured to provide breathing air to the mask 11 from the breathing gas source in response to the reduced pressure in the mask 11. When the user breathes out, non-return valves in the inner mask 14 prevent exhaled air from returning into the mask 11 and the exhaled air is directed either directly out of the mask or back into the LDV 12 to 'flush' over the LDV diaphragm (if present). Where the invention is utilised with a CCBA, it will be understood that exhaled air may be directed back, via the CCBA connector port, into the CCBA circuit for re-circulation.

The LDV 12 comprises one or more control elements, such as function buttons 15, which perform various actions in relation to the LDV 12 or the breathing apparatus generally. For example, there may be a function button 15 to reset the LDV 12 before the first breath is taken or if a reset is required during use. Other function buttons 15 may release the LDV 12 from the face mask 11, or initiate a 'free-flow" state, amongst other features. It will be understood that when the user is wearing the breathing apparatus 10, they may be in an environment where visibility is low, for example at the site of emergency, it may be dark or smoke may impair vision. Accordingly, it is important for the user of the breathing apparatus to know the locations of the features of their breathing apparatus are without visual clues.

Figures 2A, 2B, 2C:
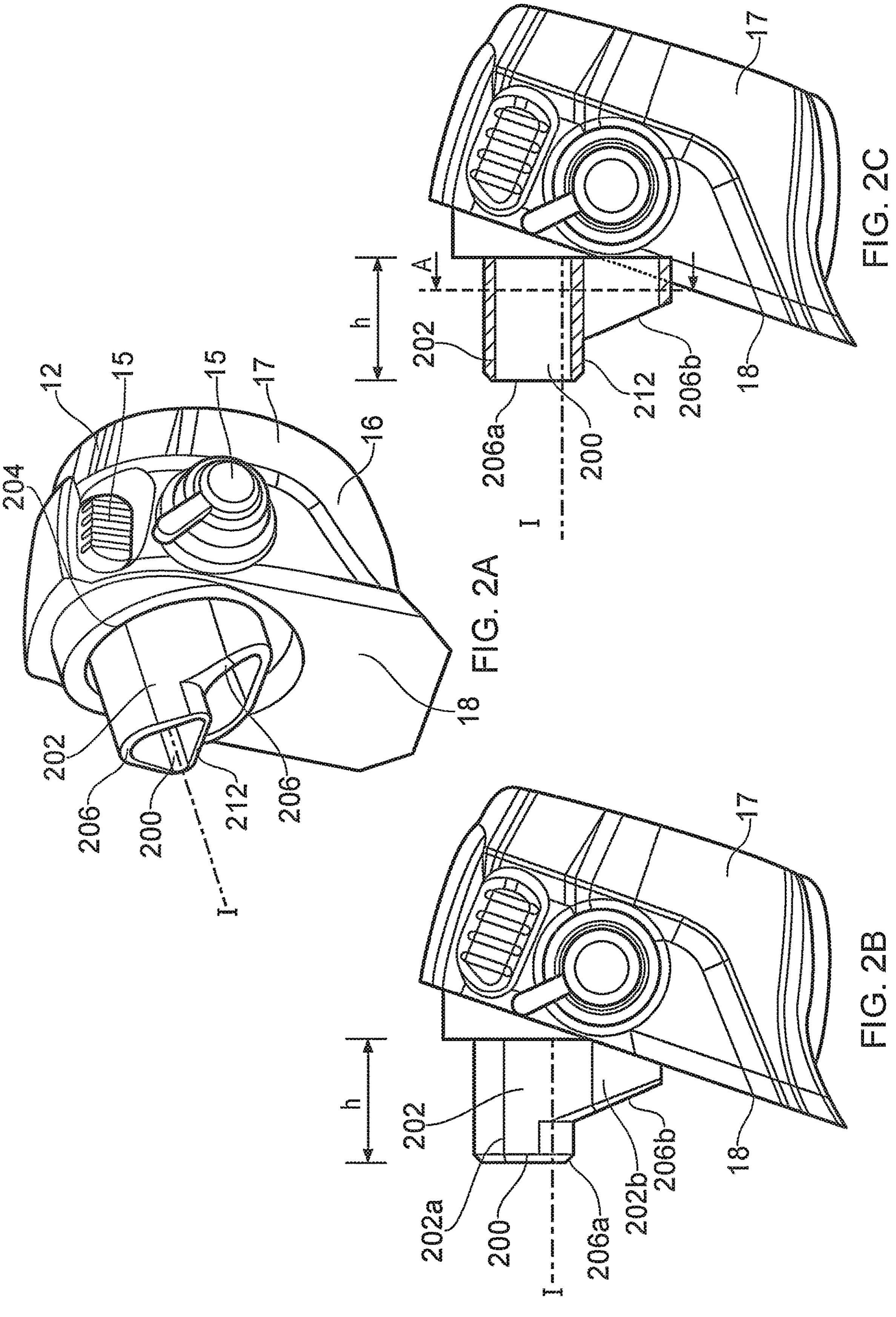
FIG. 2 shows an example of a lung demand valve comprising a male connector for a connection apparatus for connecting the lung demand valve to a breathing face mask.

Turning to FIG. 2, an exemplary male connector 200 of the connection apparatus 100 is shown in more detail. In this example, the male connector 200 is provided on the LDV 12, but it should be understood that in other examples, the male connector may be provided on a face mask 11. FIG. 2*a* shows a perspective view of the LDV 12 comprising the male connector (or "connector") 200. FIG. 2*b* shows a side view of the LDV 12 and the connector 200 and FIG. 2*c* shows a partial sectional side view of the LDV 12 with the connector 200 shown in cross-section in a vertical plane bisecting the connector 200 (i.e. plane C shown in FIG. 3*a*).

Referring to FIGS. 1 and 2, the LDV 12 comprises a housing 16 which comprises an outer-facing part 17 which is exposed externally when the LDV 12 is attached to the mask 11. The housing 16 of the LDV 12 also comprises a mask-engaging part 18 which is configured to abut a housing 19 of the mask 11 in use. The male connector 200 is generally configured to protrude from the LDV 12 on the mask-engaging part 18 such that the connector 200 is received in the mask 11 when the mask-engaging part 18 abuts the mask 11 in use, as will be described below with respect to FIGS. 4-6.

The male connector 200 defines an axis I along which the connector 200 is configured to be inserted into a corresponding female port, as described below. Referring additionally now to FIG. 3, which shows a cross-sectional view of the connector 200 along the plane A shown in FIG. 2*c*, the connector 200 comprises a perimeter wall 202 which defines an external surface or perimeter of the connector 200. As shown best in FIGS. 2*a* and 2*b*, the perimeter wall 202 extends outwardly from a proximal edge 204 at the LDV 12 to a distal edge 206. In this example, the perimeter wall 202 extends generally parallel to the insertion axis I of the connector 200. In other examples, the perimeter wall 202 could taper radially inwardly with respect to the insertion axis I such that the connector 200 is narrower at its distal end than its proximal end. It should be understood that the insertion axis I may be a notional or theoretical axis which defines or is defined by the insertion direction of the male connector 200 when received axially into a female port.

Although the connector 200 is open across its distal end, it will be understood that the distal edge 206 of the perimeter wall 202 generally defines a distal face of the perimeter wall 202. The distal face of the perimeter wall 202 should be understood as a notional face or surface which would extend across the connector 200 between all points on the distal edge 206 of the wall 202 (e.g. in the manner of a drum skin). The distal face may be defined by a highlight surface of the connector 200 and/or the perimeter wall. In this example, the distal face of the perimeter wall 202 is also the distal face of the connector of the connector 200 but, in other examples, one or more parts of the connector 200 may extend beyond the distal edge 206 of the perimeter wall 202.

Figure 3C:
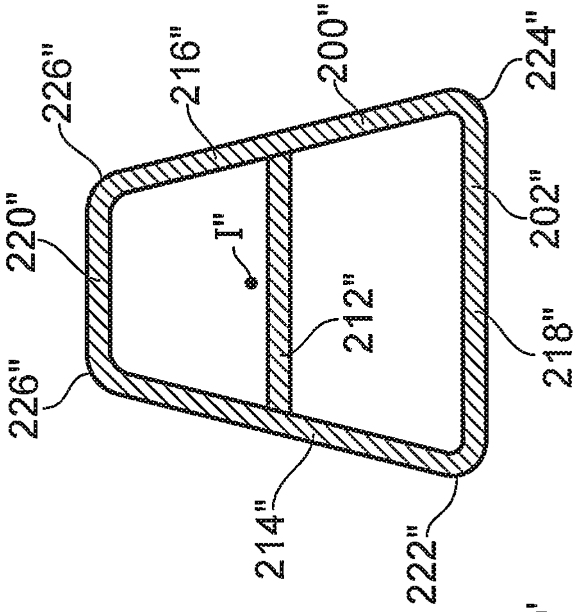
FIG. 3 shows alternative examples of the male connector of FIG. 2.
Figure 3B:
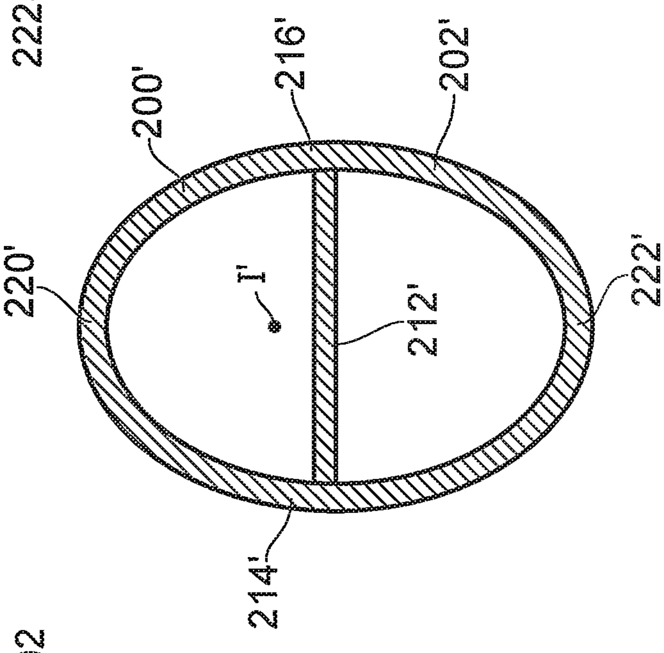
Figure 3A:
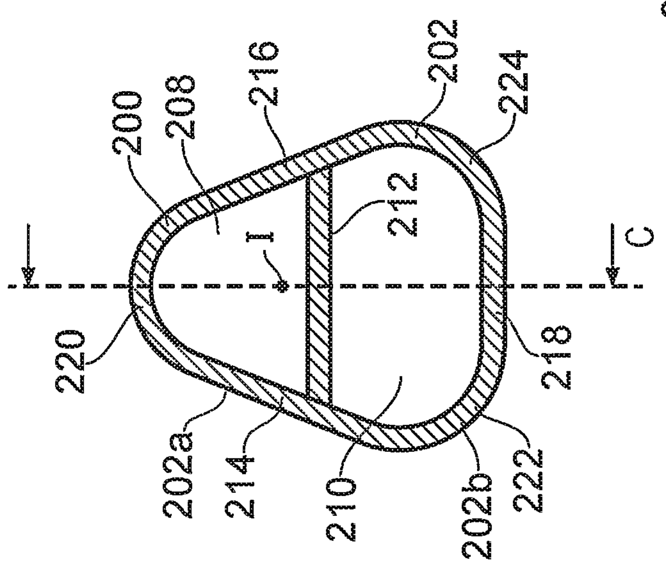

As shown in FIG. 3*a*, the perimeter wall 202 completely encircles the connector 200 and contains first and second conduits 208,210 formed through the connector 200 for the transport of gas to and from the mask 11. The first and second conduits 208,210 are separated by a partition wall 212 which extends across the connector 200 between opposing sides of the perimeter wall 202. In some other examples one conduit, or more than two conduits may be provided. In other examples, there may be one or more gaps or openings in the perimeter wall 202 such that it does not completely encircle the connector 200.

As shown in FIGS. 2*b* and 2*c*, the perimeter wall 202 varies in height h, measured from its proximal edge 204 to its distal edge 206, about the perimeter of the connector. A first portion 202*a* of the perimeter wall has a constant height such that its distal edge 206*a* lies in a plane which is perpendicular to the insertion axis I of the connector and, in this example, to the direction of extension of the wall 202. A second portion 202*b* of the perimeter wall has a gradually reducing height such that its distal edge 206*b* lies in a plane which is inclined with respect to the insertion axis I and, in this example, the direction of extension of the wall 202. A step change in the height of the perimeter wall occurs proximate the points of connection of the partition wall 212 to the perimeter wall 202 such that the first portion 202*a* of the perimeter wall and the partition wall 212 (and the first conduit 208 formed therein) extend from the LDV 12 to a significantly greater extent than the second portion 202*b* of the perimeter wall (and the second conduit 210 formed therein). In other examples, no step change may be present.

Referring again to FIG. 3*a*, the cross-sectional shape of the connector 200, which is defined by the shape of the perimeter wall 202 will be discussed in more detail. The connector 200 is substantially prismatic when viewed along the insertion axis as shown in FIG. 3*a*. The cross-sectional shape of the perimeter wall 202 is generally triangular and, in particular, generally isosceles triangular. The perimeter wall comprises first 214, second 216, and third 218 wall portions which are substantially planar. The first and second wall portions 214,216 taper together towards their respective upper edges and meet at, and are connected by, an apex portion 220 in the form of a radiused edge of the wall 202. In other examples, the apex portion 220 may be a sharp line connection between the wall portions 214,216 or a chamfer between the wall portions 214,216.

Likewise, the lateral distance between the first and second wall portions 214,216 increases towards the respective lower edges. At the lower edges of the first and second wall portions 214,216, first and second vertex portions 222,224 connect the first and second wall portions to opposing lateral edges of the third wall portion 218. The vertex portions 222,224 are radiused, but in other examples may be a line connection between the wall portions, or a chamfer therebetween.

It should be understood that, generally, the male connector 200 may have first and second wall portions which are connected at an apex portion. The apex portion may be a portion of the perimeter wall 202 which forms an angle between the first and second wall portions such that a vertex is formed between the first and second wall portions.

Other shapes of the male connector, and the perimeter wall thereof, can be envisaged to provide at least first and second wall portions which are connected by an apex portion, for example as illustrated in FIGS. 3*b* and 3*c*. Like features between FIGS. 3*a*-*c* are indicated by reference numerals differing by ' marks. FIG. 3*b* illustrates an alternative example of a male connector 200' having an elliptically-shaped perimeter wall 202'. The portions of the perimeter wall which extend generally along the major axis of the ellipse can be considered as the first and second wall portions 214',216'. The first and second wall portions 214', 216' meet at an apex portion 220' at the uppermost part of the perimeter wall. FIG. 3*c* shows a yet further alternative example of a male connector 200" with a trapezoidally-shaped perimeter wall 202". The first and second wall portions 214",216" are the tapering side portions of the trapezoid, which are connected by an apex wall portion 220". In this example, the apex wall portion 220" forms a 'chamfer' between the first and second wall portions 214", 216". The vertex portions 222",224 between the third wall portions 218" and the first and second wall portions 214", 216" are radiused like those in the example of FIG. 3*a*, as are the vertices 226" formed between the wall portions 214", 216" and the apex wall portion 220".

Also generally, it will be understood that the shapes for the perimeter wall of the male connector proposed have non-infinite orders of rotational symmetry. For example, the connectors 200 and 200" have order of rotational symmetry 1, and the connector 200' has order of rotational symmetry 2. Other examples of perimeter walls could be envisaged having other integer orders of rotational symmetry, such as a square cross-sectional shape (order 4) or an equilateral triangle cross-sectional shape (order 3). A circular cross-sectional shape for the perimeter wall may not be considered to have an apex portion as it has infinite order of rotational symmetry. However, a part-circular (e.g. semi-circular or wedge) shape having a non-infinite order of rotational symmetry may be considered to have wall portions connected by an apex portion.

Figure 4A:
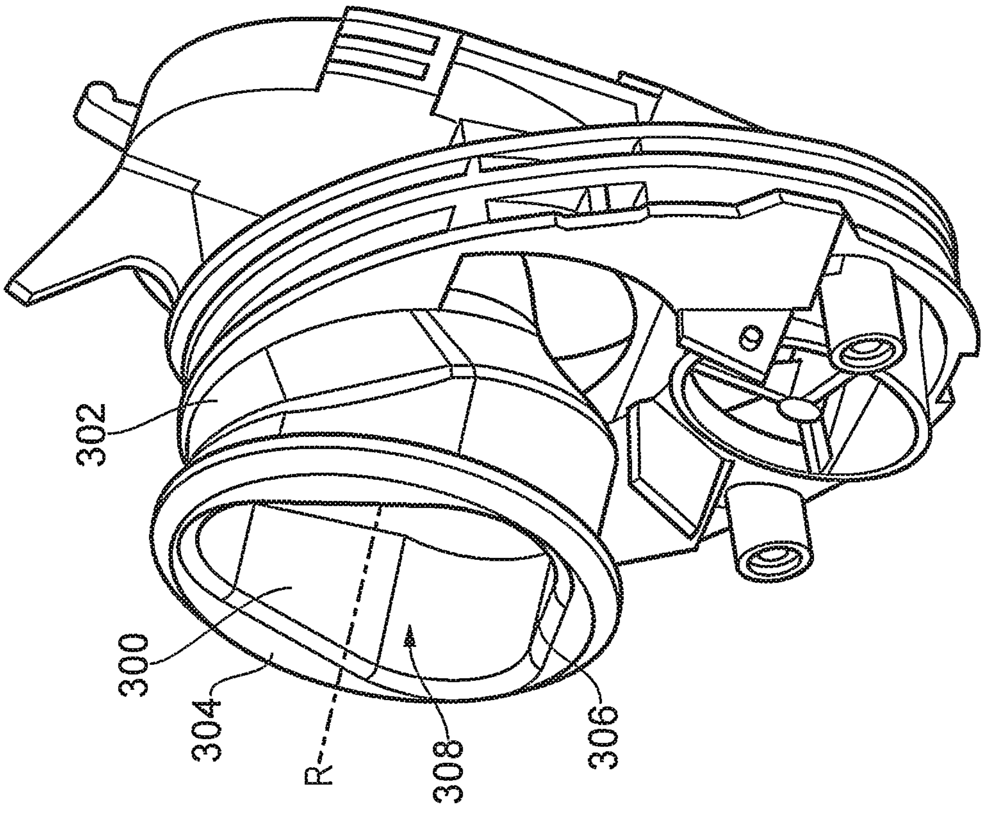
FIG. 4 shows an example of a female port apparatus for receiving a male connector.
Figure 4B:
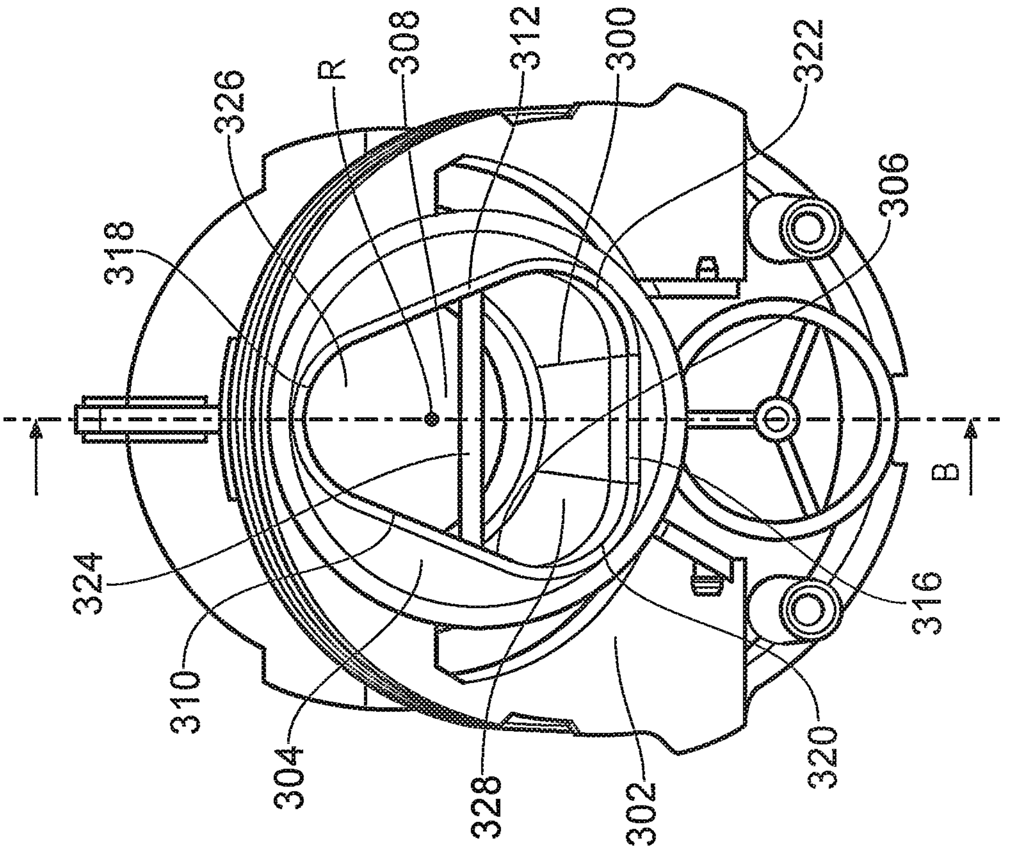

Referring now to FIG. 4, a corresponding female port 300 for receiving a male connector is shown. FIG. 4*a* shows the female port 300 in perspective view and FIG. 4*b* shows the female port 300 in a front view. In this example, the female port 300 corresponds to the male connector 200 shown in FIG. 2*a* and discussed above. It will be understood that, generally, the male connector and the corresponding female port are complimentarily shaped and therefore the female ports corresponding to other male connectors than the exemplary male connector 200 will have different shapes complimentary for those other male connectors.

Figure 5:
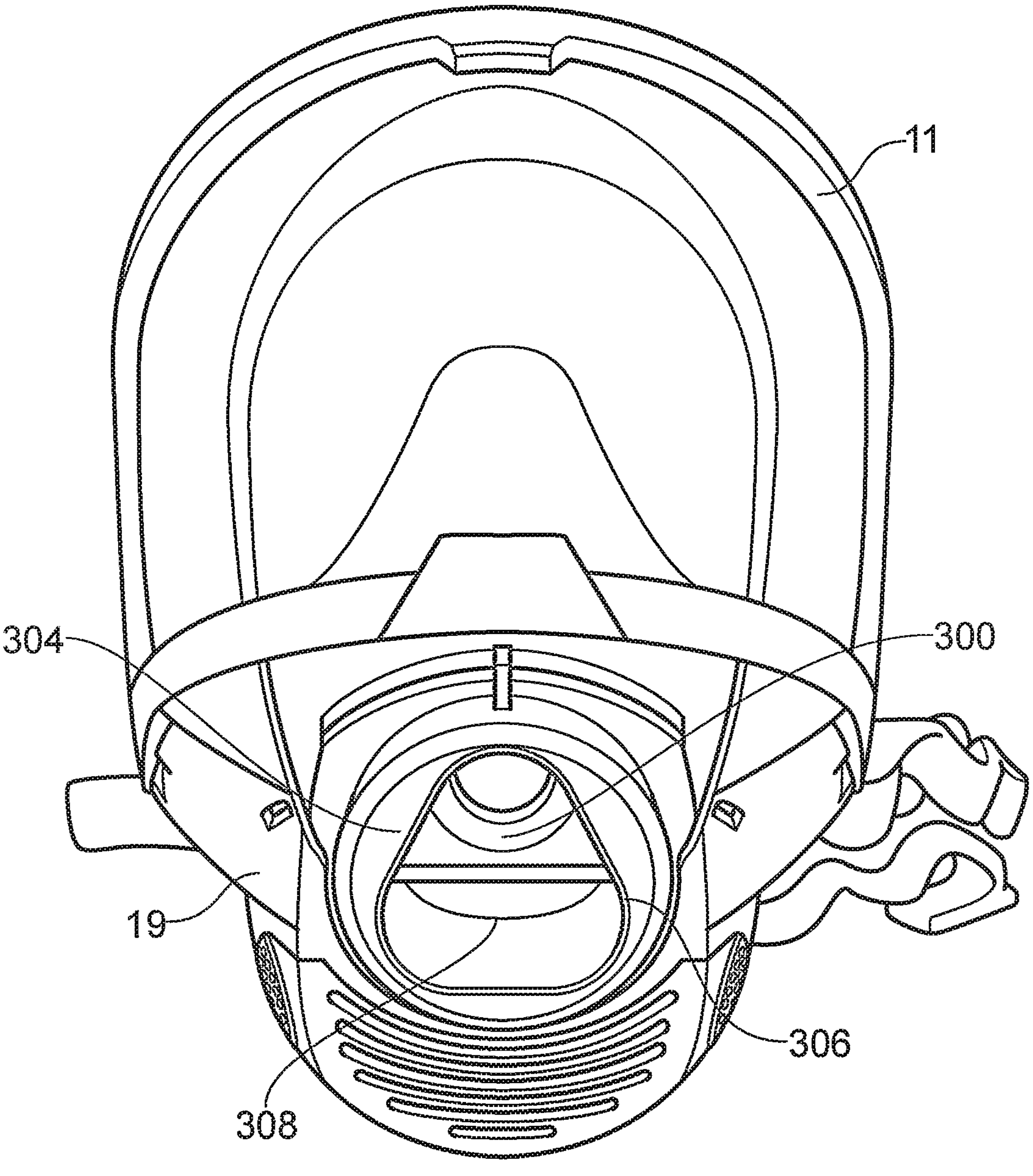
FIG. 5 shows an example of a breathing face mask comprising the female port of FIG. 4.

The female port 300 is shown provided on the face mask 11 in FIG. 5. The female port 300 is formed in a port housing 302 which, in use, is predominantly received beneath the housing 19 of the face mask 11. The port housing 302 comprises an LDV-engaging portion 304 which is externally exposed from the housing 19 of the face mask 11. The LDV-engaging portion 304 provides a substantially planar circular face against which the mask-engaging part 18 of the LDV abuts when the LDV 12 and the mask 11 are connected in use. The LDV-engaging portion of the port housing 302 encircles the port 300 itself.

The female port 300 is formed by a peripheral wall 306 which extends generally into the port housing 302 to form a cavity 308 into which the male connector 200 can be received. The peripheral wall 306 is shaped complimentarily to the perimeter wall 202 of the male connector 200. The port 300 defines a receiving axis R along which the male connector 200 is received in the port 300. In particular, when the male connector 200 is received into the port 300 such that the LDV-engaging portion 304 and the mask-engaging part 18 abut, the receiving axis R and the insertion axis I are coaxial.

As the peripheral wall 306 of the port 300 is formed to compliment the shape of the peripheral wall of the male connector 200, it will be understood that the internal surface of the peripheral wall 306 is shaped substantially similar to the external surface of the perimeter wall 202 so as to provide a sliding fit when then connector 200 is guided into the port 300 with the receiving and insertion axes arranged coaxially.

The port 300 is, like the connector 200, substantially prismatic when viewed along the receiving axis R as shown in FIG. 4*b*. The internal cross-sectional shape of the peripheral wall 306 is generally triangular and, in particular, generally isosceles triangular. The peripheral wall comprises first 310, second 312, and third 316 wall portions which are substantially planar. The first and second wall portions 310,312 taper together towards their respective upper edges and meet at, and are connected by, an apex channel portion 318 in the form of an internally-radiused edge. The apex channel portion 318 is configured to receive and engage the apex portion 220 of the male connector 200 in use.

Likewise, the lateral distance between the first and second wall portions 310,312 increases towards the respective lower edges. At the lower edges of the first and second wall portions 310,312, first and second vertex channel portions 320,322 connect the first and second wall portions to opposing lateral edges of the third wall portion 316. The vertex channel portions 320,322 are radiused, but in other examples may be a line connection between the wall portions, or a chamfer therebetween. The vertex channel portions 320,322 are configured to receive the vertex portions 222,224 of the male connector 200 in use.

The female port 300 comprises a partition wall element 324 which partitions the cavity 308 into first and second conduits 326,328 corresponding to and connectable with the first and second conduits 208,210 of the male connector in use. One or more sealing features may be provided on the male connector 200 or the port 300 to prevent fluid flow between the first and second pairs of conduits 208/326 and 210/328 in use.

The male connector 200 or the female port 300 may have one or more locking features (not shown) which enable the male connector 200 to be releasably locked in place in the female port 300 in use to avoid inadvertent disconnection of the two parts of the connection apparatus 100.

It should be understood that the description of the shape of the female port 300 in FIG. 4 is specific to the corresponding port for the male connector 200 of FIG. 2*a*. Similarly, it should be understood that for other shapes of male connector, the corresponding female port will have a peripheral wall which is shaped so as to compliment and receive the male connector in a slidable manner in use. For example, the male connector 200' of FIG. 3*b* would have a corresponding elliptically shaped female port, and the male connector 200" of FIG. 3*c* would have a corresponding trapezoidally shaped female port.

Figure 6:
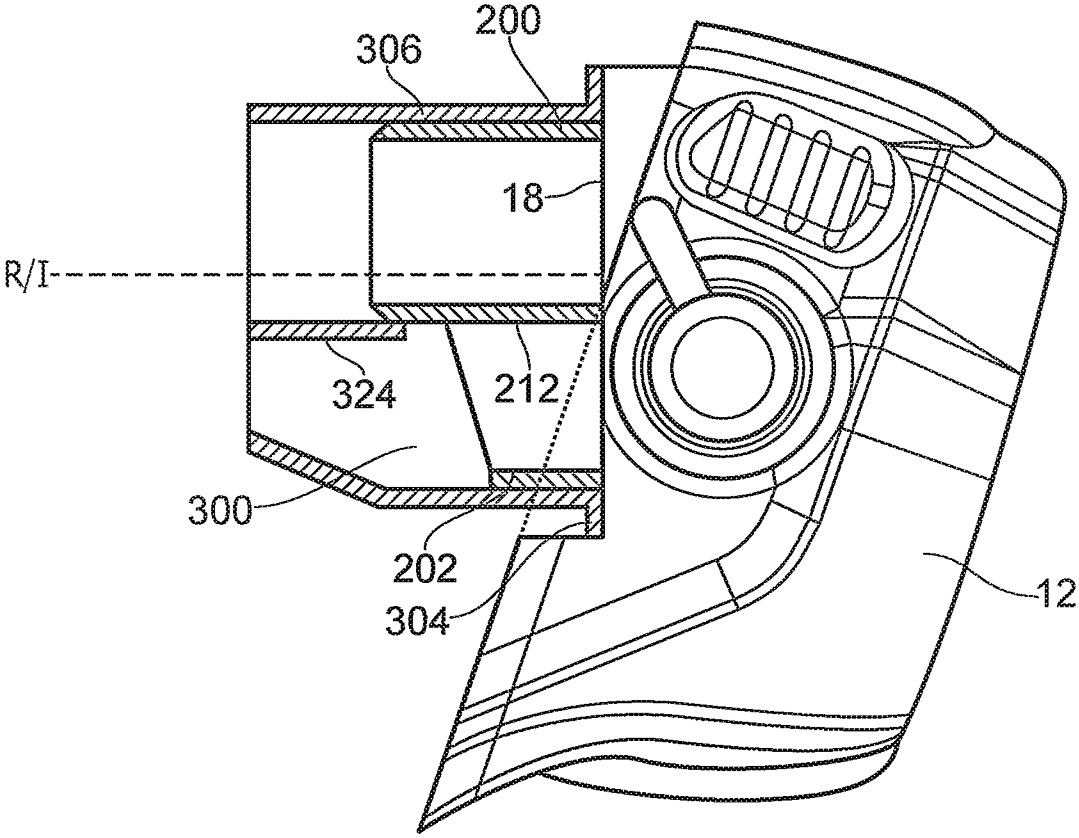
FIG. 6 shows a partial sectional side view of an example of a connection apparatus comprising a male connector and a female port when connected.

Referring now to FIG. 6 the connection of the male connector 200 and the female port 300 will be described in more detail. This figure shows the LDV 12, with the male connector 200 shown in cross-section and shows the female port 300 in cross section on plane B shown in FIG. 4*b*. For ease of understanding, FIG. 6 shows the female port 300 without the surrounding housing 302 and mask 11.

In FIG. 6, the male connector 200 is fully received within the female port 300. As shown, the insertion axis I and the receiving axis R are substantially coaxial. The external surface of the perimeter wall 202 of the male connector 200 slidably engages the internal surface of the peripheral wall 306 of the female port 300 about the entire perimeter of the male connector 200. The LDV-engaging part 304 of the port housing 302 abuts the mask-engaging part 18 of the LDV 12. It will be understood that, absent any locking mechanism (or with any provided locking mechanism unlocked), the male connector 200 is slidable into and out of the female port along the aligned insertion/receiving axes I/R. Accordingly, in order to connect the LDV 12 to the mask 11, the LDV 12 can be brought into a position in which the connector 200 and the port 300 are axially and rotationally aligned (i.e. with the insertion/receiving axes I/R arranged coaxially) and moved axially towards the port 300 to thereby slide the male connector 200 into the port 300. Conversely, to disconnect the LDV 12 and the mask 11, the LDV 12 can be moved axially away from the port 300 such that the male connector 200 slides axially out of the port 300.

By providing a male connector which comprises a perimeter wall comprising an apex portion, it may have a low order of rotational symmetry as discussed above. This provides the advantage that the male connector may be receivable into the corresponding female port in a different number of orientations equal to the order of rotational symmetry. If, like the male connector 200 discussed above, the connector has only one degree of rotational symmetry, then it may be installed in the female port in only a single orientation. If the male connector has a low number, such as an order of 2 or 3 rotational symmetry, then there will be a 180 degree or 120 degree rotational mismatch required between the male connector and female port to install the connector in a different orientation. Therefore, the connection apparatus described herein may enable an LDV and a facemask to be connected in a single fixed rotational orientation. Accordingly, any control features, such as the buttons 15, which are provided on the LDV may be in a known orientation with respect to the mask 11 and the user, and therefore it will be possible for the user to memorise and intuitively know the position of the control features in low visibility.

It should be understood however that the requirement for a specific alignment of the male connector and female port may make it more difficult for the user to insert the connector into the port. In particular, the LDV is often attached to the face mask after the mask is donned, so the user cannot see the exact location and relative orientation of the connector and the port.

The connection apparatus described herein also serve to alleviate these additional problems as will be described with respect to FIGS. 7 and 8.

Figure 7B:
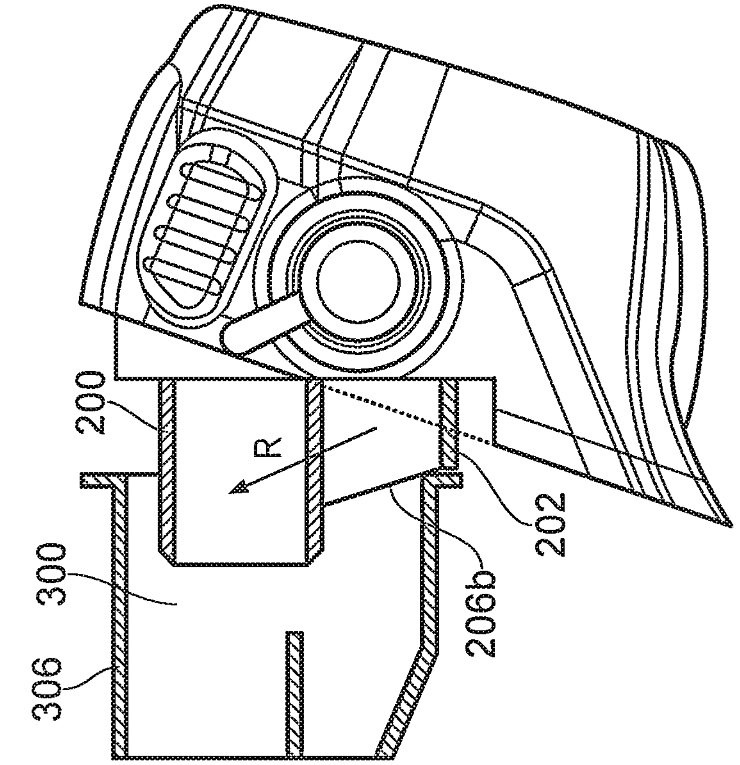
FIG. 7 shows a partial sectional side view of the interaction between a male connector and a female port when vertically misaligned during a connecting operation.
Figure 7A:
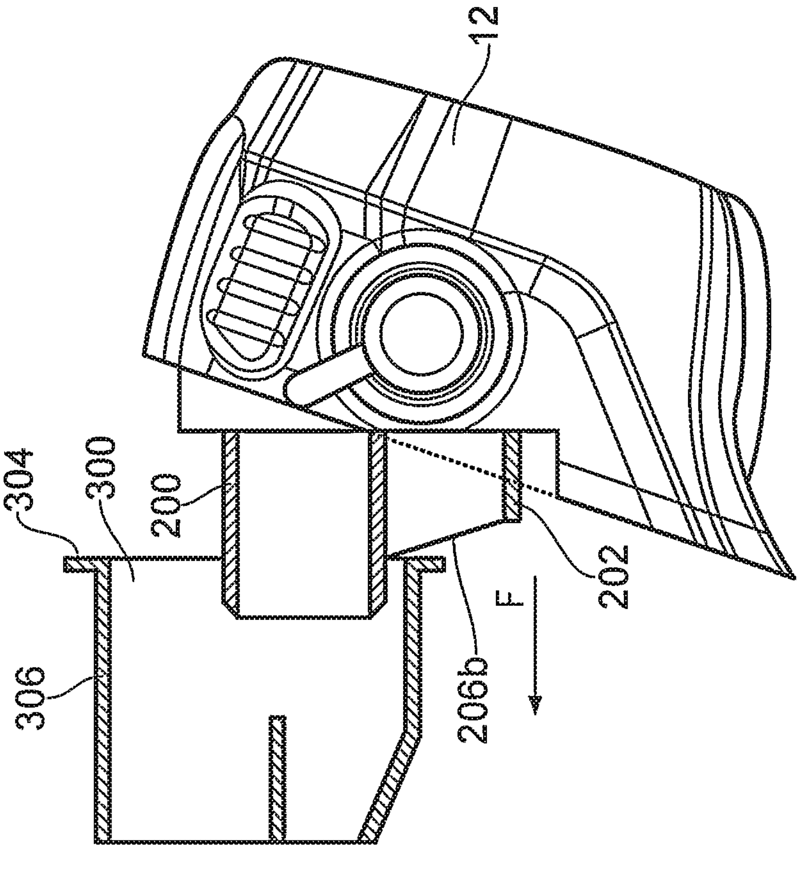

First, in FIGS. 7*a* and 7*b*, a transverse misalignment of the male connector and the female port will be discussed. A transverse misalignment is generally a translational misalignment of the connector and the female port in a plane perpendicular to the insertion/receiving axes. FIG. 7*a* illustrates the scenario in which the male connector, in this case an exemplary connector 200, is vertically misaligned with the female port 300 when connection is attempted. As is evident from FIG. 7*a*, the male connector 200 is too low to be slidingly received within the port 300 in a direction directly parallel the receiving axis.

If the LDV 12, with the male connector 200 is moved towards the port 300 in the direction shown in arrow F, then the first part of the connector to contact a part of the port 300 will be the inclined portion 206*b* of the perimeter wall 202, which as discussed above, is inclined with respect to the direction of the insertion axis I. Once a force is applied to the LDV in the direction F, the contact between the inclined portion 206*b* and the edge between the peripheral wall 306 and the LDV-engaging portion 304 will result in movement of the LDV 12 and the male connector 200 in a resultant direction R, shown in FIG. 7*b*, as the inclined portion 206*b* of the perimeter wall 202 slides in a direction shown by arrow R parallel to the inclined portion 206. As should be understood, once the male connector 200 has moved in direction R by a sufficient distance that the lower part of the male connector 200 moves within the boundary of the peripheral wall 306, then the continued application of force on the LDV in direction F will slide the male connector into the port 300 in a direction parallel to the insertion/receiving axes R/I which will now be coaxially aligned, substantially as shown in FIG. 6.

Accordingly, it will be understood that by providing an inclined portion of the perimeter wall of the male connector, a transverse misalignment of the male connector and the female port may be automatically correctable during a connection operation by virtue of the geometry of the connection apparatus.

Turning now to FIG. 8, the operation of the connection apparatus in the event of a rotational misalignment between the male connector and the female port will be discussed. In this example, the installation operation will be discussed with respect to an exemplary male connector 200 and female port 300 as discussed above. For simplicity, only the cross-sectional shape of the male connector 200 along plane A in FIG. 2*c*, and the peripheral wall 306 of the female port 300 is shown.

Figure 8A:
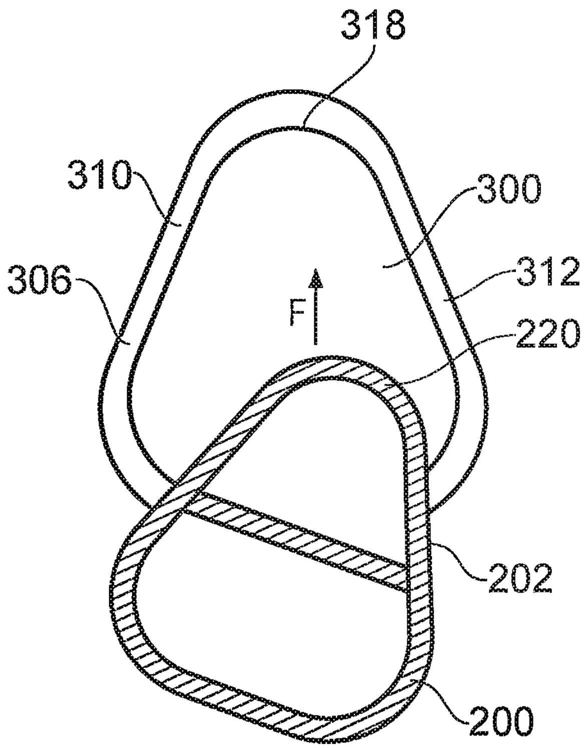
FIG. 8 shows a partial sectional view of the interaction between a male connector and a female port when rotationally misaligned during a connecting operation.

As shown in FIG. 8*a*, the male connector 200 is initially rotationally and vertically misaligned with the female port 300. The user may be instructed to install the male connector 200 in a generally upward direction as indicated by arrow F in FIG. 8*a*. In addition, or alternatively, the upward movement in direction F may be caused by the sliding of an inclined portion of the perimeter wall 206 as described in FIG. 7, if such an inclined portion is provided. It should be understood that an axial movement of the male connector 200 towards the female port 300 (i.e. into the page in FIG. 8) may also be occurring in the steps shown in FIG. 8. In other examples, the apex portion configured to be arranged to face downwardly or laterally in use, so the user might be instructed to install the male connector into the female port in a downward or lateral direction and similar alignment advantages to those described herein may still be provided.

Figure 8B:
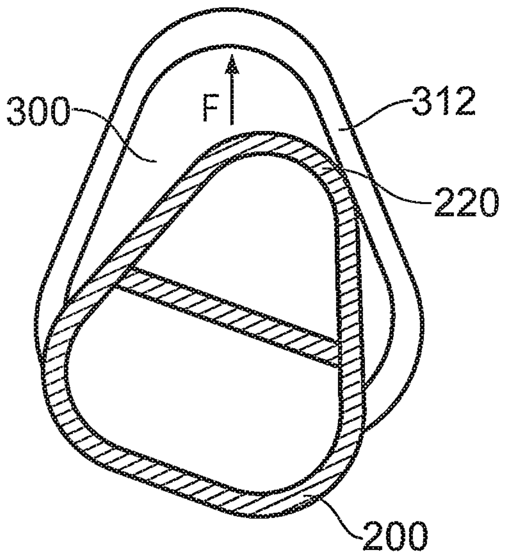
Figure 8C:
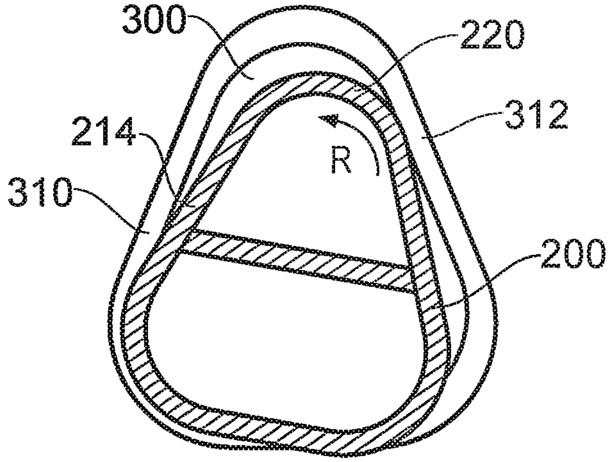

Although the male connector 200 is rotationally misaligned with the female port, as the male connector comprises an apex portion 220 as the uppermost part thereof, the apex portion 220 will remain as (or proximate to) the uppermost vertical part of the male connector 200 despite the rotational misalignment. Therefore, as the male connector 200 moved upwardly in direction F as shown in FIG. 8*b*, the apex portion first contacts the wall portion 312 of the female port 300.

As further upward movement of the male connector 200 occurs, the contact between the apex portion 220 and the wall portion 312 acts to urge the male connector to move to the left with respect to the view of FIG. 8. However, as shown in FIG. 8*c*, contact between the left wall portion 214 of the male connector 200 and the left wall portion 310 of the female port 300 may prevent or inhibit lateral movement in this direction by the male connector 200. Accordingly, the contact between the apex portion 220 and the wall portion 312 results in a rotational movement R of the male connector 200 with respect to the female port 300.

Figure 8D:
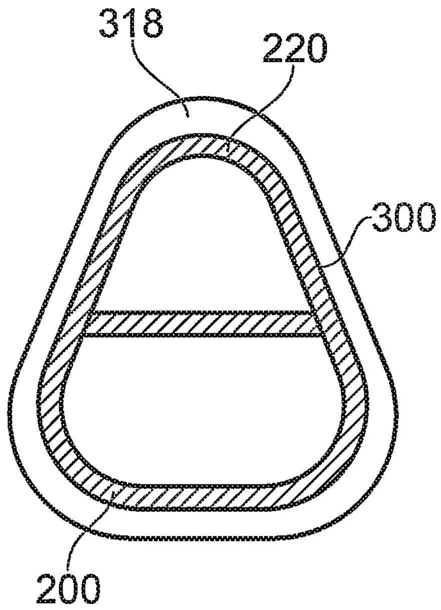

With further upward and forward pressure on the male connector 200, as illustrated in FIG. 8*d*, the apex portion 318 will automatically settle in the apex channel portion 318 of the port 300 which is shaped so as to receive the apex portion 220. In this position, the male connector 200 can be merely axially moved the remaining distance into the female port 300.

Thus, the configuration of the connection apparatus described herein provides automatic correction of rotational misalignments between the male connector and a female port during an installation operation. The features of the connection apparatus described herein may be generally understood to provide a self-correcting lateral, transverse and/or rotational movement of the male connector with respect to the female port when a force is applied to the male connector towards the female port when misaligned during installation.

The examples of FIGS. 7 and 8 are illustrated in relation to the male connector 200 and corresponding female port 300. However, it should be understood that similar advantages can be achieved by connection apparatus comprising alternative examples of male connectors (such as, but not limited to the male connectors 200' and 200" described above) and corresponding female ports.

It should be understood that the features of the inclined portion of the perimeter wall of the male connector and the apex portion of the male connector in combination provide a particularly advantageous embodiment. However, it should also be understood that each of these features provides its own advantages in the absence of the other feature.

The invention claimed is:

1. A connection apparatus for connecting breathing gas delivery components of a breathing apparatus comprising:

a male connector configured to be received in a corresponding female port, the male connector comprising a perimeter wall defining an external shape of the male connector, the perimeter wall including a proximal edge and a distal edge;

wherein the male connector defines an insertion axis along which the male connector is receivable into the corresponding female port, said insertion axis extending from the proximal edge to the distal edge; and wherein the distal edge of the perimeter wall comprises a first distal edge portion which is substantially perpendicular to the insertion axis and defines a single first conduit to transport breathing gas, and a second distal edge portion which is inclined with respect to the insertion axis and defines a single second conduit to transport breathing gas, and wherein the first distal edge portion extends further from the proximal edge than the second distal edge portion, such that the first distal edge portion is received in the corresponding female port prior to the second distal edge portion being received in the corresponding female port.

2. The connection apparatus as claimed in claim 1, wherein the perimeter wall extends in a direction parallel to the insertion axis of the male connector.

3. The connection apparatus as claimed in claim 1, wherein the second distal edge portion is formed in a plane which is inclined with respect to the insertion axis.

4. The connection apparatus as claimed in claim 1, wherein a step is formed in the distal edge between the first distal edge portion and the second distal edge portion.

5. The connection apparatus as claimed in claim 1, wherein the second distal edge portion of the distal edge forms a chamfered face between the first distal edge portion and an outer surface of the perimeter wall.

6. The connection apparatus as claimed in claim 1, wherein the male connector further comprises a partition wall extending internally between the proximal edge and the distal edge of the perimeter wall so as to form first and second conduits within the male connector.

7. The connection apparatus as claimed in claim 1, wherein the first distal edge portion is formed on a first side of the partition wall and the second distal edge portion is formed on a second side of the partition wall.

8. The connection apparatus as claimed in claim 1, wherein the perimeter wall is configured such that a perimeter of the male connector comprises an apex portion.

9. The connection apparatus as claimed in claim 8, wherein a height of at least a portion of the perimeter wall decreases with increasing distance away from the apex portion such that the second distal edge portion is formed in a plane which is inclined away from the apex portion.

10. The connection apparatus as claimed in claim 1, wherein the perimeter wall is configured such that a perimeter of the male connector is substantially triangular.

11. The connection apparatus as claimed in claim 1, wherein the perimeter wall is configured such that a perimeter of the male connector is substantially elliptical or oval.

12. The connection apparatus as claimed in claim 1, wherein the perimeter wall is configured such that the male connector has an integer order of rotational symmetry about the insertion axis, wherein the perimeter wall is configured such that the male connector has rotational symmetry of order 1, order 2, order 3, or order 4 about the insertion axis.

13. The connection apparatus as claimed in claim 1, further comprising a corresponding female port for receiving the male connector, wherein the corresponding female port comprises a peripheral wall defining a cavity for receiving the male connector.

14. The connection apparatus as claimed in claim 13, wherein the connection apparatus is configured such that, when the second distal edge portion of the male connector is in contact with a portion of the peripheral wall of the female port, the application of force on the male connector towards the female port results in a lateral and/or rotational movement of the male connector with respect to the female port.

15. The connection apparatus as claimed in claim 13, wherein the male connector is provided on a breathing gas supply component and the female port is provided on a breathing face mask, or wherein the male connector is provided on a breathing face mask and the female port is provided on a breathing gas supply component.

16. The connection apparatus as claimed in claim 15, wherein the breathing gas supply component is a lung demand valve or a Closed Circuit Breathing Apparatus (CCBA) connector for supplying breathing gas from a CCBA to the breathing face mask.

17. The breathing apparatus comprising:

a source of breathing gas configured to be supported by a user, a breathing face mask configured to be worn by the user, a breathing gas supply component configured to deliver breathing gas from the source of breathing gas to the breathing face mask, wherein the breathing apparatus includes the connection apparatus as claimed in claim 1 for connecting the breathing gas supply component to the breathing face mask.

18. A connection apparatus for connecting breathing gas delivery components of a breathing apparatus, comprising:

a male connector configured to be received in a corresponding female port, the male connector comprising a perimeter wall which defines an external shape of the male connector, the perimeter wall enclosing first and second conduits to transport breathing gas;

wherein the male connector defines an insertion axis along which the male connector is receivable into the corresponding female port;

wherein the perimeter wall comprises first and second wall portions which taper together such that a first edge of the first wall portion and a first edge of the second wall portion are connected at an apex portion;

wherein the perimeter wall comprises a first distal edge portion defining the first conduit to transport breathing gas and not defining the second conduit to transport breathing gas, and a second distal edge portion defining the second conduit to transport breathing gas and not defining the first conduit to transport breathing gas;

wherein the first distal edge portion is substantially perpendicular to the insertion axis and the second distal edge portion is inclined with respect to the insertion axis; and wherein the first distal edge portion is received in the corresponding female port prior to the second distal edge portion being received in the corresponding female port.

19. The connection apparatus as claimed in claim 18, wherein the perimeter wall comprises a third wall portion which tapers together with the first and second wall portions respectively such that a first edge of the third wall portion and a second edge of the first wall portion meet at a first corner portion, and a second edge of the third wall portion and a second edge of the second wall portion meet at a second corner portion.

20. The connection apparatus as claimed in claim 18, wherein the perimeter wall is configured such that the male connector has a substantially triangular external cross-sectional shape.

21. The connection apparatus as claimed in claim 18, wherein the perimeter wall is configured such that the male connector has a substantially elliptical or oval external cross-sectional shape.

22. The connection apparatus as claimed in claim 18, wherein the apex portion is a radiused apex portion between the first and second wall portions.

23. The connection apparatus as claimed in claim 18, wherein the connection apparatus is configured such that the apex portion comprises an uppermost part of the male connector when received in the female port.

* * * * *